United States Patent [19]
Kashima

[11] Patent Number: 5,179,676

[45] Date of Patent: Jan. 12, 1993

[54] ADDRESS SELECTION CIRCUIT INCLUDING ADDRESS COUNTERS FOR PERFORMING ADDRESS SELECTION

[75] Inventor: Masahiko Kashima, Kawasaki, Japan

[73] Assignee: Kabushiki Kaisha Toshiba, Kawasaki, Japan

[21] Appl. No.: 303,375

[22] Filed: Jan. 30, 1989

[30] Foreign Application Priority Data

Feb. 9, 1988 [JP] Japan .................................. 63-28101

[51] Int. Cl.⁵ .......................................... G06F 12/00
[52] U.S. Cl. .......................... 395/400; 364/DIG. 1; 364/254.9; 364/255.1; 364/260.6
[58] Field of Search ................ 364/200, 900, 254.9, 364/961.1, 255.1, 955.0

[56] References Cited

U.S. PATENT DOCUMENTS

| | | | |
|---|---|---|---|
| 3,593,313 | 7/1971 | Tomaszewski | 364/200 |
| 3,657,705 | 4/1972 | Mekota et al. | 364/200 |
| 3,735,355 | 5/1973 | Balogh, Jr. et al. | 364/200 |
| 3,771,133 | 11/1973 | Kashio | 364/900 |
| 3,914,746 | 1/1975 | Kashima | 364/200 |
| 3,976,976 | 8/1976 | Khosharian | 364/200 |
| 4,051,460 | 9/1977 | Yamada et al. | 364/900 |
| 4,162,519 | 7/1979 | Hanewinkel | 364/200 |
| 4,361,868 | 11/1982 | Kaplinsky | 364/200 |
| 4,433,377 | 2/1984 | Eustis et al. | 364/200 |
| 4,513,395 | 4/1985 | Henry et al. | 364/900 |

Primary Examiner—David L. Clark
Assistant Examiner—Maria N. Van Buhr
Attorney, Agent, or Firm—Finnegan, Henderson, Farabow, Garrett and Dunner

[57] ABSTRACT

An n-bit address selecting instruction read from a program ROM encludes a control bit part and an nm-bit (m<n) operand part. Data used for address selection is stored in k (k≦m) extra bit positions of the control bit part. The data stored in the control bit part is supplied to a control bit data detecting circuit. The detecting circuit is responsive to the control bit data in the control bit part to produce first and second control signals. Detecting an address selecting instruction, the detecting circuit produces the first control signal so that a first data entry gate is enabled. When the first data entry gate is enabled, address selecting data stored in the operand part included in the address selecting instruction is written into an m-bit address counter. When the detecting circuit detects the address selecting instruction and that the number of bits of an address to be selected is "m+1" bits or more, the second control signal enables a second data entry gate. As a result, part of data in the control bit part is written into a k-bit address counter as address selecting data. The "m+k"-bit address selecting data is output from the m-bit address counter and the k-bit address counter. The bits of the address output are supplied to the program ROM simultaneously.

17 Claims, 4 Drawing Sheets

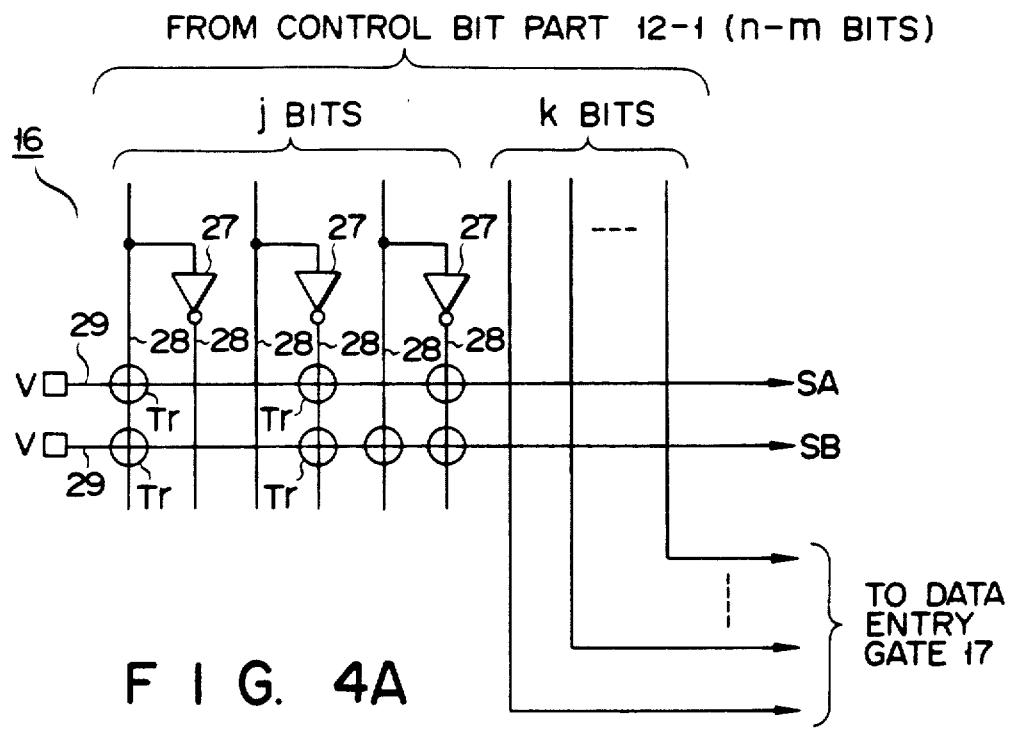
F I G. 4A
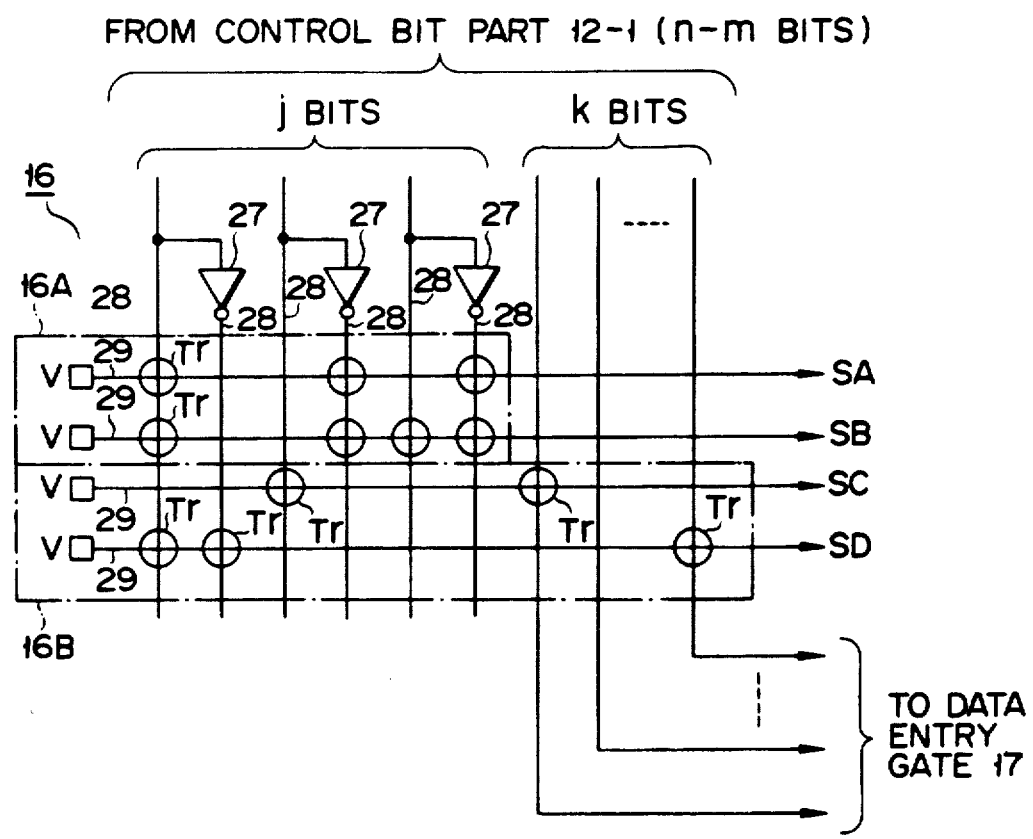
F I G. 4B

ADDRESS SELECTION CIRCUIT INCLUDING ADDRESS COUNTERS FOR PERFORMING ADDRESS SELECTION

BACKGROUND OF THE INVENTION

1. Field of the Invention

The present invention relates to an address selection circuit for selecting addresses of a program ROM (read-only memory) contained in an LSI (large-scale integrated circuit) of a computer system, such as a microcomputer system.

2. Description of the Related Art

In microcomputer systems, address selection circuits are used to select addresses of a program ROM contained in an LSI and storing a control program and data for readout only. A prior art address selection circuit is arranged as shown in FIG. 1.

Included in an n-bit instruction word read from a program ROM 11 is an address selecting instruction 12 used to select addresses of the ROM consisting of a control bit part 12-1 and an m-bit (m<n) operand part 12-2. Control bit part 12-1 contains control bit data, while operand part 12-2 contains address selection data. In operand part 12-2, address selecting data for ROM 11 is described in a length of m bits. Data entry gate 13 is controlled by the control bit data in control bit part 12-1. When data entry gate 13 is enabled, the address selecting data in operand part 12-2 is loaded into counter 14 through gate 13. The parallel output bits (address output) of m-bit address counter 14 are applied to program ROM 11 as its address data.

Such an address selection circuit as shown in FIG. 1, however, cannot select addresses with more than m bits. That is, the number of bits of address data which can be selected is governed by the limited number of bits in operand part 12-2, making it impossible to prepare a program for address data whose number of bits is larger than that of the operand part. If operand part 12-2 were expanded up to the desired number m' of bits, the number of bits in an output instruction of program ROM 11 would have to be increased by "m'−m" bits. The number of signal lines of a data bus and the number of bits in an instruction register would thus have to be increased correspondingly, and the occupied area of the program ROM in the LSI would be increased.

A Japanese laid-open patent publication No. 61-48174 discloses a data storage device in which stored contents of a program ROM are selected within a semiconductor memory so as to produce address selected data. The data storage device has a memory for address selecting data as well as a main memory. The data read out from the main memory is subjected to selection by the data read out from the selecting data memory.

According to the data storage device disclosed in the patent publication, however, an extra selecting data memory is required, and the selecting data in the selecting data memory must be increased in number for intricate data selections. This will disadvantageously increase the area of a semiconductor chip.

SUMMARY OF THE INVENTION

It is accordingly an object of the present invention to provide an address selection circuit which is capable of selecting addresses which are larger in bit number than the operand part of an address selecting instruction without increasing the area of a semiconductor chip.

According to the present invention, there is provided an address selection circuit comprising: a control bit data detecting circuit connected to receive data in a control bit part of an n-bit address selecting instruction having the control bit part and an m-bit (n>m) operand part for producing a first control signal when detecting that the control bit data in the control bit part is an instruction for address selection and a second control signal when detecting that the number of bits of an address to be selected is "m+1" bits or more; a first m-bit address counter circuit responsive to the first control signal to be loaded with address selecting data stored in the operand part; and a second k-bit (k<m) address counter circuit responsive to the second control signal to be loaded with part of data in the control bit part as address selecting data when the address selecting instruction is detected and that the number of bits of an address to be selected is "m+1" bits or more is detected by the detecting circuit.

With such an arrangement, since k extra bits in the control bit part are used as address selecting data, the selection of addresses of "k+m" bits in excess of m bits is made possible without expansion of the number of bits in the operand part. In this case, since the address selection is performed in one step of a program, the operating speed will not be lowered. It is also possible to keep the bit length of the operand part as it was. Address selected data can be supplied to the program ROM storing instructions without particular provision of a selecting data memory.

Accordingly, there is provided an address selection circuit which can select addresses which are larger in bit number than the operand parts of address selecting instructions without leading to an increase in the area of a semiconductor chip.

BRIEF DESCRIPTION OF THE DRAWINGS

FIGS. 4A through 4C show practical arrangements of the control bit data detecting circuit of FIGS. 2 and 3.

DETAILED DESCRIPTION OF THE PREFERRED EMBODIMENTS

Figure 2:
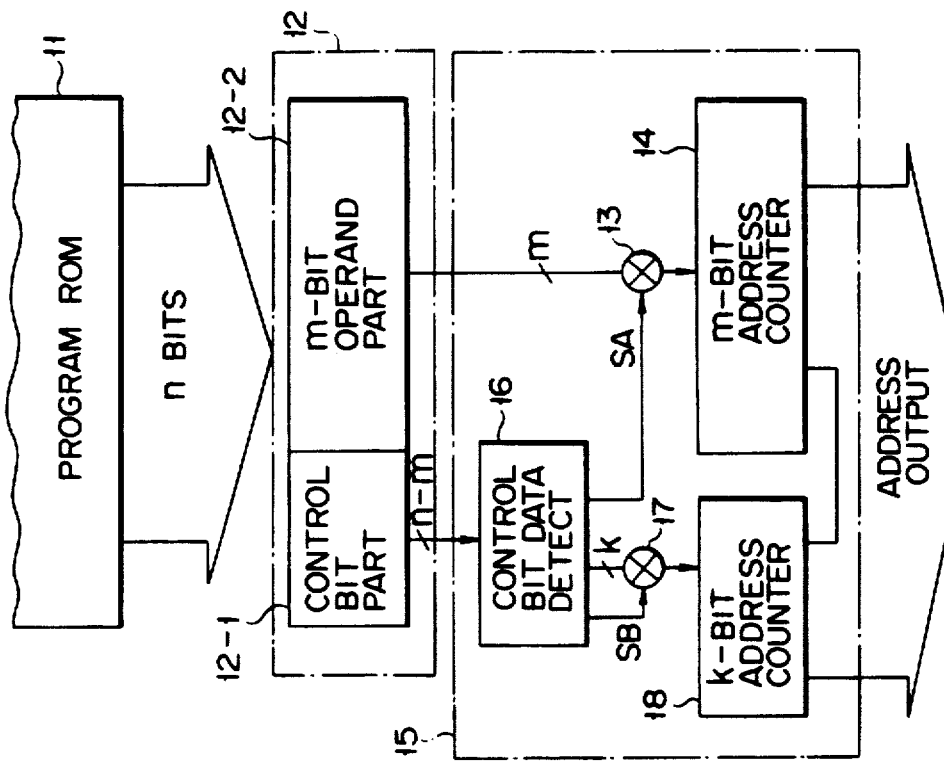
FIG. 2 is a block diagram of an address selection circuit embodying the present invention.
Figure 1:
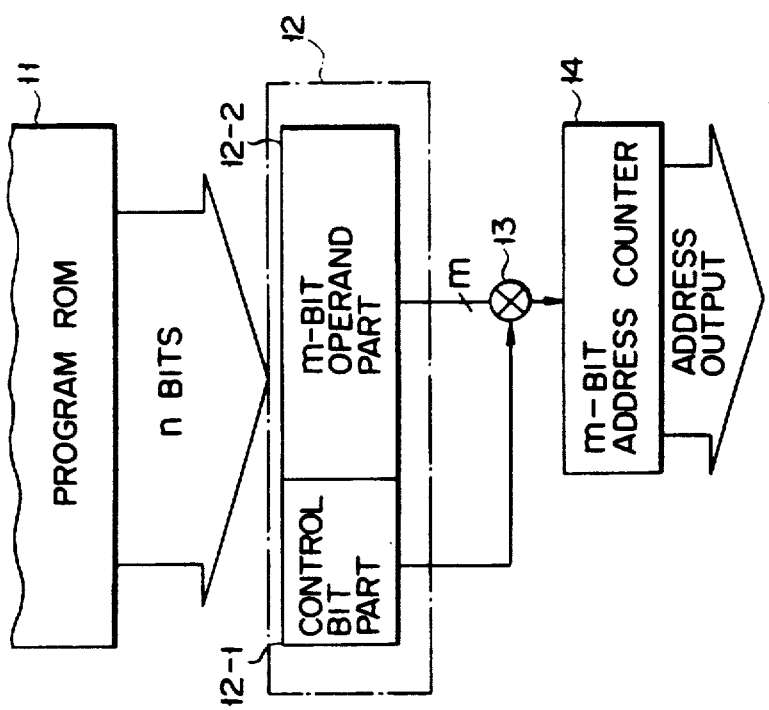
FIG. 1 is a block diagram of a prior art address selection circuit.

Referring now to FIG. 2, an address selection circuit embodying the invention comprises a control bit data detecting circuit 16, a first data entry gate 13, an m-bit address counter 14, a second data entry gate 17 and a k-bit (k≦m) address counter 18. In an n-bit instruction word read from program ROM 11, an address selecting instruction 12 intended to select the addresses of program ROM 11 is comprised of a control bit part 12-1 and an m-bit (m<n) operand part 12-2. Control bit part 12-1 contains control bit data, and data used for address selection, while operand part 12-2 contains address selecting data. In control bit part 12-1, control bit data is described in j-bit length. In extra bit positions, for example, k low-order bit positions (into which 0s are usually written) of control bit part 12-1, data used for selecting ROM addresses is described in k-bit length. In operand part 12-2, data for selecting the ROM addresses is described in m-bit length. Since control bit part 12-1 is "n−m" bits in length, n−m=j+k.

Control bit data detecting circuit 16 is supplied with the control bit data of n-m bits contained in the n-bit address selecting instruction read from program ROM 11 so as to produce first and second control signals SA and SB and output the k-bit data used for address selection. Detecting circuit 16 has a function to decide whether the control bit data in control bit part 12-1 is an address selecting instruction or not and whether the range for address selection is "m+1" bits or more or not. The m-bit address selecting data contained in the address selecting instruction is written into address counter 14.

Data entry gate 13 is controlled by first control signal SA from detecting circuit 16. When detecting circuit 16 detects an address selecting instruction, gate 13 is enabled to transmit the address selecting data contained in operand part 12-2 of the address selecting instruction to m-bit address counter 14. On the other hand, data entry gate 17 is controlled by second control signal SB from detecting circuit 16. When detecting circuit 16 detects that a instruction read from ROM 11 is an address selecting instruction, and address selecting data is "m+1" bits or more in length, data entry gate 17 is enabled to transmit the k-bit data contained in control bit part 12-1 and used for address selection to k-bit address counter 18.

In operation, an n-bit instruction is read from program ROM 11 first. The control bit data in the n-bit instruction is applied to control bit data detecting circuit 16. Detecting circuit 16 decodes which type of instruction is specified by the n-bit instruction. That is, by detecting circuit 16 decisions are made as to whether the n-bit instruction is an instruction for address selection or not and whether the bit range for address selection is "m+1" bits or more or not. If detecting circuit 16 decides that the n-bit instruction is for address selection and the address selection range is below "m+1" bits, then data entry gate 13 is enabled so that the address selecting data in operand part 12-2 is written into address counter 14 through data entry gate 13. The address which has been written into address counter 14 is incremented or decremented and transmitted to program ROM 11 as selected address data.

On the other hand, when it is decided that the n-bit instruction is an instruction for address selection and the address selection range is "m+1" bits or more, data entry gates 13 and 17 are enabled by control signals SA and SB, respectively. As a result, the address selecting data in operand part 12-2 is written into address counter 14 through data entry gate 13. At the same time, the k low-order bits in control bit part 12-1 are written into address counter 18 through data entry gate 17 as address selecting data. The "k+m"-bit data written into address counters 14 and 18 is incremented or decremented and transmitted to program ROM 11 as selected address data. According to the address selection circuit described above, since the k extra bits in control bit part 12-1 can be used as address selecting data, address selection of "k+m" bits in excess of m bits is made possible without expanding the bit length of operand part 12-2. In the present case, since an address selection can be performed in one step of a program, the operation speed can be prevented from being lowered and the bit length of the operand part of an instruction may be kept unchanged. Furthermore, address selected data can be supplied to program ROM 11 storing instructions without particular provision of a memory for selecting data. Therefore, addresses which are greater in bit length than the operand part of address selecting instructions can be selected without leading to an increase in the area of a semiconductor chip used. If address selection circuit 15 and program ROM 11 are integrated together into a semiconductor chip on a large scale, an LSI having a high-performance program control function will be realized without expansion of the occupied area of the ROM and lowering the limit of LSI operating speed.

Figure 3:
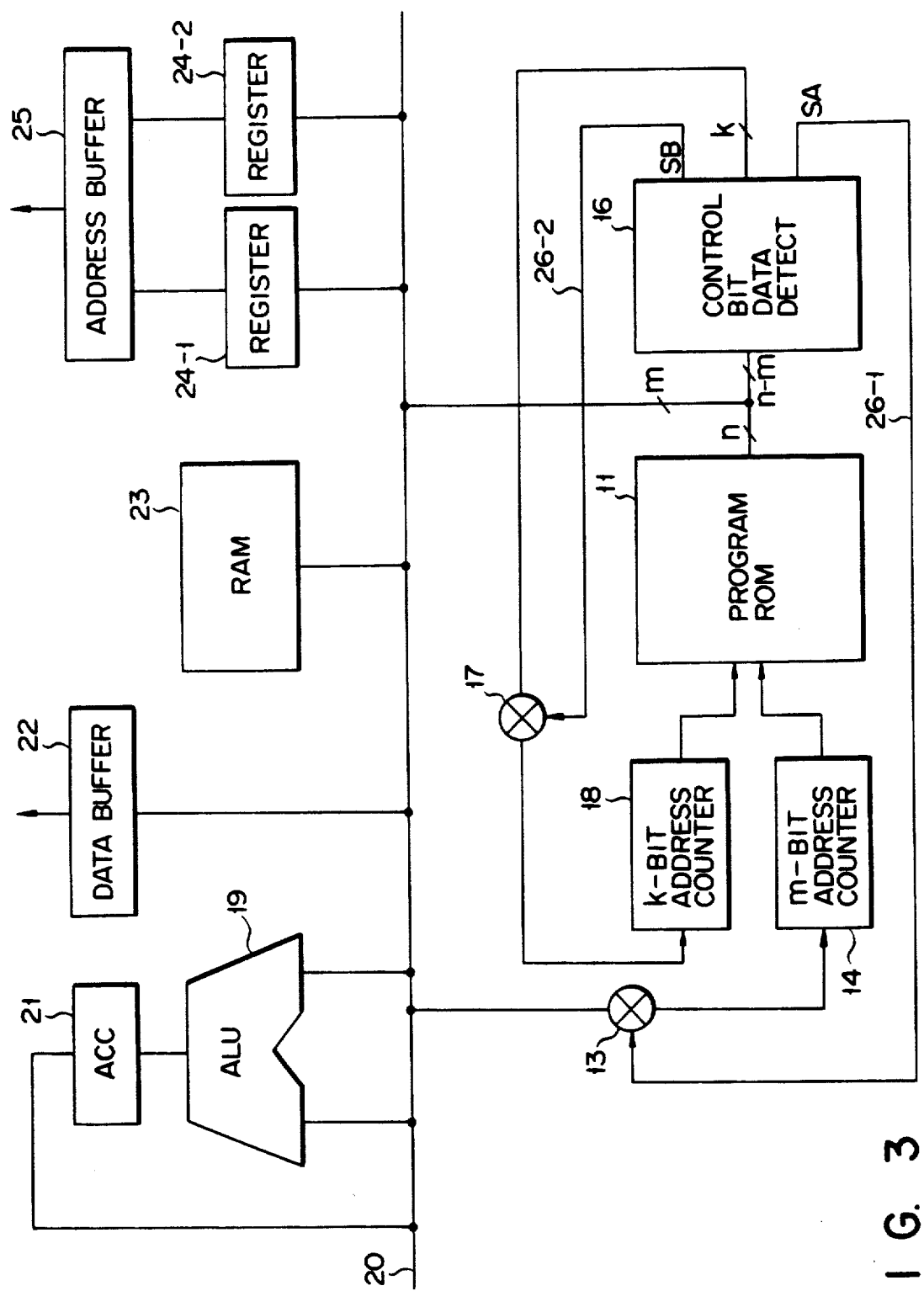
FIG. 3 is a block diagram of a portion of a microcomputer in which the address selection circuit of FIG. 2 is contained.

FIG. 3 schematically shows an arrangement of a portion of an LSI, such as a microcomputer, which contains a program ROM and has a program control function. An ALU (arithmetic logic unit) 19 has first and second inputs connected to an internal bus 20. An accumulator 21 has an input connected to the output of ALU 19 and an output connected to internal bus 20. A data buffer 22 has an input connected to internal bus 20 and an output connected to an external output pin. A RAM (random access memory) 23 is connected to internal bus 20. Addresses and data are written into and read from RAM 23. Registers 24-1 and 24-2 have inputs connected to internal bus 20 and outputs connected to inputs of an address buffer 25. The output of address buffer 25 is connected to an external output pin.

Of n-bit output lines of program ROM 11, m-bit lines (corresponding to the operand part) are connected to internal bus 20 and "n−m"-bit lines (corresponding to the control bit part) are connected to input lines of control bit detecting circuit 16. Data entry gate 13 is connected between internal bus 20 and m-bit address counter 14. Connected between the control input of data entry gate 13 and one of the control signal outputs of detecting circuit 16 is a signal line 26-1 for transferring control signal SA from detecting circuit 16 to data entry gate 13. Data entry gate 17 is connected between k-bit output lines of detecting circuit 16 and input lines of k-bit address counter 18. Connected between the control input of data entry gate 17 and the other control signal output of detecting circuit 16 is a signal line 26-2 for transferring control signal SB from detecting circuit 16 to data entry gate 17. Address input lines of program ROM 11 are connected to output lines of address counters 14 and 18.

With such an arrangement as described above, various devices connected inside and outside the microcomputer are subjected to control on the basis of data stored in program ROM 11. The selection of addresses of ROM 11 is performed in substantially the same manner as in the circuit of FIG. 2. The arrangement of FIG. 3 only differs from that of FIG. 2 in that data in the operand part of an instruction read from program ROM 11 is applied to data entry gate 13 via internal bus 20. It will thus be understood that the arrangement of FIG. 3 is the same as that of FIG. 2 in operation and advantage.

Figure 4C:
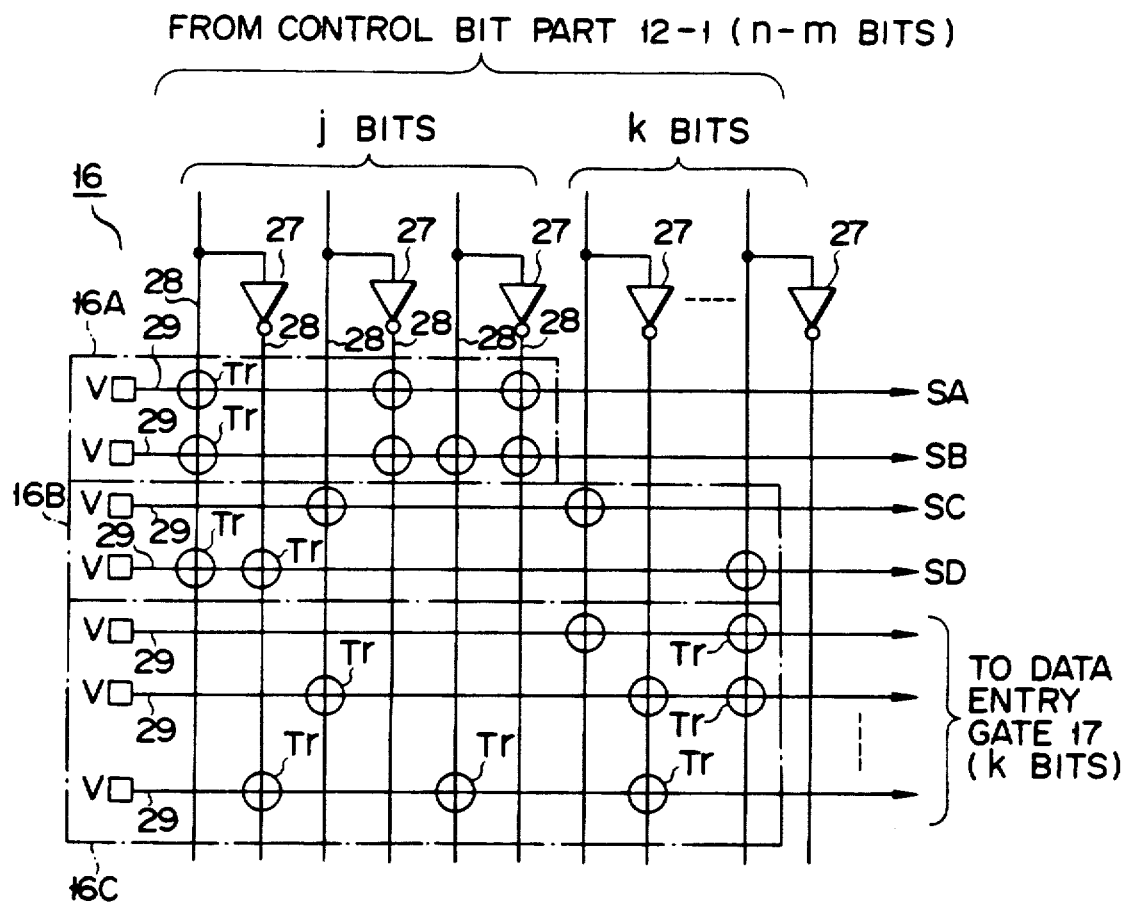

FIGS. 4A through 4C show practical arrangements of control bit detecting circuit shown in FIGS. 2 and 3. In the arrangement of FIG. 4A, control bit detecting circuit 16 is formed of a decoder (mask ROM). The decoder is arranged to decide whether the control bits (j high-order bits) of the control bit part specify a instruction for address selection or not and whether the range for address selection is "m+1" bits or more or not in order to produce control signals SA and SB. The decoder has parallel input lines 28 to which control bits and complemented control bits obtained through inverters 27 are applied. Output signal lines 29 are formed to intersect input signal lines 28. The end of each of signal lines 29 is connected to a power supply V. Transistors Tr are formed at selected intersections of input signal lines 28 and output signal lines 29. Each of transistors Tr is connected to receive at its gate a control bit or a complemented control bit. When all the transistors in the same row (connected to the same output signal line) are turned on, a "H" level voltage of power supply V is transmitted over the conducting transistors so that control signal SA or SB goes to a "H" level. As a result, data entry gate 13 or 17 is enabled. The k low-order bits used for address selection is supplied to data entry gate 17 via the decoder.

Detecting circuit 16 shown in FIG. 4B is adapted to produce control signals SC and SD for controlling peripheral circuits not shown in addition to control signals SA and SB. Detecting circuit 16 is comprised of a first decoder (mask ROM) 16A adapted to produce control signals SA and SB and a second decoder (mask ROM) 16B adapted to produce control signals SC and SD. First decoder 16A is the same as the circuit shown in FIG. 4A. Control signals SC and SD are produced by decoding the j-bit control data and the k-bit data. The k-bit data used for address selection is supplied to data entry gate 17 via second decoder 16B.

In the circuits shown in FIGS. 4A and 4B, the k low-order bits of control bit part 12-1 are directly used for address selection. However, the circuit shown in FIG. 4C is adapted to decode the "j+K"-bit data to produce the k-bit address selecting data. More specifically, detecting circuit 16 is comprised of first decoder (mask ROM) 16A for producing control signals SA and SB, second decoder (mask ROM) 16B for producing control signals SC and SD and third decoder (mask ROM) 16C for producing address selecting data. Control signals SA, SB, SC and SD are produced in the same manner as in the circuit shown in FIG. 4B. The k-bit address selecting data is produced by decoding the j control bits and the k bits in third decoder 16C. The resulting address selecting data is supplied to address counter 18 via data entry gate 17.

In the circuit of FIG. 4C, decoder 16B adapted to produce control signals SC and SD for controlling peripheral circuits may be omitted. Each of the output signal lines has its one end connected to power supply V to obtain a decode output. Alternatively, each output signal line may have the end connected to ground and the other end connected to the power supply via a load, in which case control signal SA or SB goes to a "L" level when all transistors having their current paths serially connected in the same out signal line are turned on. When at least one transistor is in the off state, the control signal remains at a "H" level. Moreover, in the circuit of FIG. 4C, third decoder 16C decodes the j-bit control data and the k-bit data used for address selection. Alternatively, only data used for address selection may be decoded. The data need not be k bits in length so long as k output bits are obtained.

Figure 5:
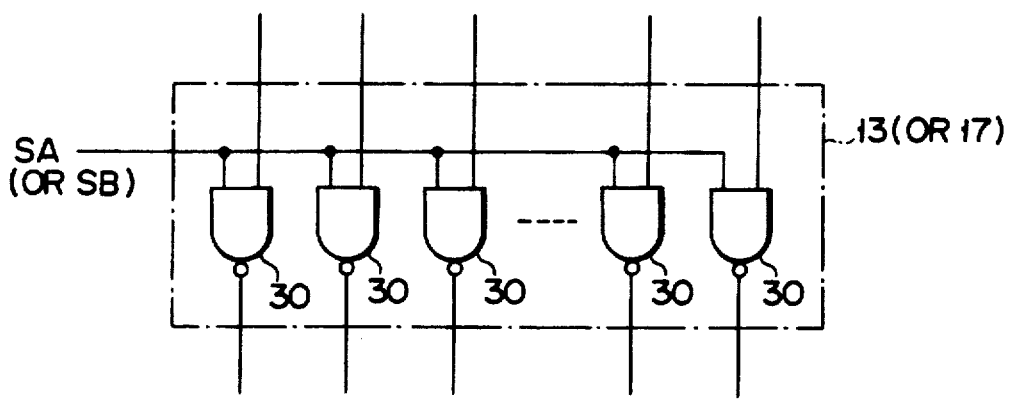
FIG. 5 shows a practical arrangement of the data entry gate of FIGS. 2 and 3.

FIG. 5 shows a practical arrangement of data entry gate 13 or 17 in the circuits of FIGS. 2 and 3. Data entry gate 13 comprises m NAND gates 30. Each of first inputs of NAND gates 30 is connected to receive a corresponding bit of address selecting data in m-bit operand part 12-2 read from ROM 11. Second inputs of NAND gates 30 are connected to receive control signal SA in common. Hence, the data entry gate performs an inverting operation when control signal SA is at a "H" level. When control signal SA is at a "L" level, each of NAND gates 30 provides a "H" level output, irrespective of the level of a corresponding input bit.

Similarly, data entry gate 17 comprises k NAND gates 30. In this case, each of first inputs of NAND gates 30 is connected to receive a corresponding bit of k-bit address selecting data output from control bit data detecting circuit 16. Second inputs of NAND gates 30 are connected to receive control signal SB in common.

As described above, according to the present invention, there is provided an address selection circuit which can select addresses which are larger in bit number than the operand parts of address selecting instructions without leading to an increase in the area of a semiconductor chip.

What is claimed is:

1. An address selection circuit comprising:
   detecting means for receiving control bit data of a control bit part of an n-bit address selecting instruction which includes the control bit part having a group of j bits and a group of k bits and an operand part, having m bits ($n=j+k+m$) the control bit data being represented by the j bits in the control bit part, the k bits in the control group part generally being available for other control use and normally being unused in the address selection mode, said detecting means outputting a first control signal when it detects from the j-bit control data that the instruction is one for address selection, and said detecting means outputting a second control signal when it detects from the j-bit control data that a number of bits of an address to be selected by the instruction is greater than or equal to $m+1$;
   said instruction operand part containing m bits of said address if said address has $m+1$ or more bits and said instruction control part containing in the k bit group those excess bits that exceed m in said address;
   m-bit address counter means, coupled to receive data of the operand part of said instruction, for carrying out address selection and for outputting a first portion of the address corresponding to the address bits in the operand part of said instruction, when said detecting means detects the instruction for address selection, said m-bit address counter means being controlled in response to the first control signal output from said detecting means; and
   k-bit ($k \leq m$) address counter means coupled to receive said address bits in excess of m of the control bit part of said instruction, for carrying out address selection and for outputting a second remaining portion of said address corresponding to the excess address bits in the control bit part of said instruction, when said detecting means detects the instruction for address selection and that the number of bits of the address to be selected is greater than or equal to $m+1$, said k-bit address counter means being controlled in response to the second control signal output from said detecting means.

2. The address selection circuit according to claim 1, wherein the address selecting instruction is read from a program ROM.

3. The address selection circuit according to claim 1, wherein said detecting means includes decoder means for decoding the control bit data of the control bit part of said instruction.

4. The address selection circuit according to claim 3, wherein said decoder means includes a mask ROM.

5. The address selection circuit according to claim 1, wherein said detecting means includes decoder means for decoding the control bit data of the control bit part of said instruction and transfer means for transferring said excess address bits of the control bit part of said instruction to said k-bit address counter means.

6. The address selection circuit according to claim 5, wherein said decoder means includes a mask ROM.

7. The address selection circuit according to claim 1, wherein said detecting means includes first decoder means for decoding the control bit data of the control bit part of said instruction and second decoder means for decoding said excess address bits of the control bit part of said instruction and supplying decoded outputs to said k-bit address counter means.

8. The address selection circuit according to claim 7, wherein each of said first and second decoder means includes a mask ROM.

9. The address selection circuit according to claim 1, wherein said m-bit address counter means comprises an m-bit address counter and a data entry gate responsive to the first control signal from said detecting means for supplying said address bits from the operand part of said instruction to said m-bit address counter.

10. The address selected circuit according to claim 1, wherein said k-bit address counter means comprises a k-bit address counter and a data entry gate responsive to the second control signal from said detecting means for supplying said excess address bits from the control bit part of said instruction to said k-bit address counter.

11. An address selection circuit comprising:

detecting means for receiving control bit data of a control bit part of an n-bit address selecting instruction which is read from a program ROM and which includes the control bit part having a group of j bits and a group of k bits and an operand part having m bits (n=j+k+m) the control bit data being represented by the j bits in the control bit part, the k bits in the control group part generally being available for other control use and normally being unused in the address selection mode, said detecting means outputting a first control signal when it detects from the j-bit control data that the instruction is one for address selection, and said detecting means outputting a second control signal when it detects from the j-bit control data that a number of bits of an address to be selected by the instruction is greater than or equal to m+1;

said instruction operand part containing m bits of said address if said address has m+1 or more bits and said instruction control part containing in the k bit group those excess bits that exceed m in said address;

m-bit address counter means, coupled to receive data of the operand part of said instruction and to provide outputs of said m-bit address counter means to said program ROM, for carrying out address selection and for outputting a first portion of the address corresponding to the address bits of the operand part of said instruction, when said detecting means detects the instruction for address selection, said m-bit address counter means being controlled in response to the first control signal output from said detecting means;

first data entry gate means, responsive to the first control signal from said detecting means, for supplying said address bits of the operand part of said instruction to said m-bit address counter means when said detecting means detects said instruction to be one for address selection;

k-bit (k≦m) address counter means, coupled to receive said address bits in excess of m of the control bit part of said instruction and to provide outputs of said k-bit address counter means to said program ROM, for carrying out address selection and for outputting a second remaining portion of said address corresponding to the excess address bits of the control bit part of said instruction when said detecting means detects said instruction to be one for address selection and that the number of bits of the address to be selected is greater than or equal to m+1, said k-bit address counter means being controlled in response to the second control signal output from said detecting means, wherein the outputs of said m-bit address counter means and said k-bit address counter means are applied to said program ROM simultaneously; and second data entry gate means, responsive to the second control signal from said detecting means, for supplying said address bits in excess of m of the control bit part of said instruction to said k-bit address counter means when said detecting means detects said instruction to be one for address selection and that the number of bits of the address to be selected is greater than or equal to m+1.

12. The address selection circuit according to claim 11, wherein said detecting means includes decoder means for decoding the control bit data of the control bit part.

13. The address selection circuit according to claim 12, wherein said decoder means includes a mask ROM.

14. The address selection circuit according to claim 11, wherein said detecting means includes decoder means for decoding the control bit data of the control bit part of said instruction and transfer means for transferring said excess address bits of the control bit part to said k-bit address counter means.

15. The address selection circuit according to claim 14, wherein said decoder means includes a mask ROM.

16. The address selection circuit according to claim 11, wherein said detecting means includes first decoder means for decoding the control bit data of the control bit part of said instruction and second decoder means for decoding said excess address bits of the control bit part of said instruction and supplying decoded outputs to said k-bit address counter means.

17. The address selection circuit according to claim 16, wherein each of said first and second decoder means includes a mask ROM.

* * * * *

UNITED STATES PATENT AND TRADEMARK OFFICE
CERTIFICATE OF CORRECTION

PATENT NO. : 5,179,676

DATED : January 12, 1993

INVENTOR(S) : Masahiko Kashima

It is certified that error appears in the above-identified patent and that said Letters Patent is hereby corrected as shown below:

TITLE PAGE:

Abstract, line 2, change "nm-bit" to --m-bit--.

Signed and Sealed this

Fourteenth Day of December, 1993

Attest:

BRUCE LEHMAN

Attesting Officer     Commissioner of Patents and Trademarks